United States Patent

Anderson

(10) Patent No.: US 9,152,441 B2
(45) Date of Patent: Oct. 6, 2015

(54) SYSTEMS AND METHODS INVOLVING VIRTUAL MACHINE HOST ISOLATION OVER A NETWORK VIA A FEDERATED DOWNSTREAM CLUSTER

(71) Applicant: VIRTUSTREAM CANADA HOLDINGS, INC., Bethesda, MD (US)

(72) Inventor: Derek Anderson, Abbotsford (CA)

(73) Assignee: Virtustream Canada Holdings, Inc., Bethesda, MD (US)

( * ) Notice: Subject to any disclaimer, the term of this patent is extended or adjusted under 35 U.S.C. 154(b) by 166 days.

(21) Appl. No.: 13/772,006

(22) Filed: Feb. 20, 2013

(65) Prior Publication Data

US 2013/0227568 A1  Aug. 29, 2013

Related U.S. Application Data

(60) Provisional application No. 61/600,888, filed on Feb. 20, 2012.

(51) Int. Cl.
*G06F 9/455* (2006.01)
*G06F 15/16* (2006.01)

(52) U.S. Cl.
CPC ........... *G06F 9/455* (2013.01); *G06F 9/45558* (2013.01); *G06F 2009/45587* (2013.01)

(58) Field of Classification Search
CPC .......... G06F 2009/45587; G06F 9/455; G06F 9/45558
USPC ....... 718/1, 104–105; 709/226, 229
See application file for complete search history.

(56) References Cited

U.S. PATENT DOCUMENTS

| | | | |
|---|---|---|---|
| 6,650,839 B1* | 11/2003 | Mallard et al. | 398/9 |
| 7,080,378 B1* | 7/2006 | Noland et al. | 718/104 |
| 7,373,451 B2 | 5/2008 | Lam | |
| 7,653,682 B2 | 1/2010 | Erasani et al. | |
| 7,890,689 B2 | 2/2011 | Lam | |
| 7,945,677 B2 | 5/2011 | Fleischer | |
| 8,161,169 B2 | 4/2012 | Fleischer | |
| 8,392,564 B1* | 3/2013 | Czajkowski et al. | 709/226 |
| 8,443,367 B1* | 5/2013 | Taylor et al. | 718/102 |
| 8,843,622 B1* | 9/2014 | Graham et al. | 709/224 |
| 2002/0087704 A1* | 7/2002 | Chesnais et al. | 709/228 |
| 2004/0006587 A1 | 1/2004 | McConnell et al. | |
| 2004/0228277 A1* | 11/2004 | Williams | 370/230 |
| 2005/0055708 A1* | 3/2005 | Gould et al. | 725/25 |
| 2005/0071453 A1* | 3/2005 | Ellis et al. | 709/223 |

(Continued)

OTHER PUBLICATIONS

"Interdomain Federation for IM and Presence Service on Cisco Unified Communications Manager, Releast 9.0(1)," Published Jul. 18, 2012.*

(Continued)

*Primary Examiner* — Alina N Boutah
(74) *Attorney, Agent, or Firm* — DLA Piper LLP (US)

(57) ABSTRACT

Systems and methods for virtual machine host isolation are disclosed. According to one implementation, an illustrative system may include a first compute node configured to be operatively coupled to a second compute node via a first application server, and to a third compute node via a second application server. In operation, the first compute node may be configured to receive an instruction from the second compute node via the first server to define a virtual machine, and send an instruction to the third compute node via the second server to define the virtual machine.

24 Claims, 6 Drawing Sheets

(56) References Cited

U.S. PATENT DOCUMENTS

| | | | |
|---|---|---|---|
| 2005/0114291 A1* | 5/2005 | Becker-Szendy et al. | 707/1 |
| 2005/0125513 A1 | 6/2005 | Lam | |
| 2006/0059226 A1 | 3/2006 | McConnell | |
| 2007/0022138 A1 | 1/2007 | Erasani | |
| 2007/0055781 A1 | 3/2007 | Fleischer | |
| 2007/0283425 A1* | 12/2007 | Ture et al. | 726/5 |
| 2007/0294405 A1* | 12/2007 | Mohindra et al. | 709/226 |
| 2008/0008162 A1* | 1/2008 | Martinez et al. | 370/352 |
| 2008/0177839 A1* | 7/2008 | Chang et al. | 709/205 |
| 2008/0192732 A1* | 8/2008 | Riley et al. | 370/352 |
| 2008/0215796 A1 | 9/2008 | Lam | |
| 2009/0132708 A1* | 5/2009 | Hayward | 709/226 |
| 2009/0135839 A1* | 5/2009 | Khasnabish | 370/401 |
| 2010/0260174 A1* | 10/2010 | Preiss et al. | 370/389 |
| 2010/0281107 A1* | 11/2010 | Fallows et al. | 709/203 |
| 2010/0306772 A1* | 12/2010 | Arnold et al. | 718/1 |
| 2011/0066672 A1 | 3/2011 | Zamarreno et al. | |
| 2011/0179133 A1 | 7/2011 | Fleischer | |
| 2011/0196925 A1* | 8/2011 | Hans et al. | 709/204 |
| 2012/0023230 A1* | 1/2012 | Hosking et al. | 709/224 |
| 2012/0147742 A1* | 6/2012 | Kitamori et al. | 370/225 |
| 2012/0216282 A1* | 8/2012 | Pappu et al. | 726/23 |
| 2012/0233117 A1* | 9/2012 | Holt et al. | 707/620 |
| 2012/0233463 A1* | 9/2012 | Holt et al. | 713/168 |
| 2013/0067088 A1* | 3/2013 | Kern et al. | 709/226 |
| 2013/0103837 A1* | 4/2013 | Krueger | 709/226 |
| 2013/0155902 A1* | 6/2013 | Feng et al. | 370/255 |

OTHER PUBLICATIONS

International Search Report issued in PCT/US2013/026907 on Jun. 3, 2013.

* cited by examiner

SYSTEMS AND METHODS INVOLVING VIRTUAL MACHINE HOST ISOLATION OVER A NETWORK VIA A FEDERATED DOWNSTREAM CLUSTER

CROSS-REFERENCE TO RELATED APPLICATIONS

This application is based on and derives the benefit of the filing date of U.S. Provisional Patent Application No. 61/600,888, filed Feb. 20, 2012. The entire content of this application is herein incorporated by reference in its entirety.

FIELD

The present disclosure is directed generally to systems and methods involving virtual machine host isolation.

BRIEF DESCRIPTION OF THE FIGURES

The accompanying drawings, which constitute a part of this specification, illustrate various implementations and aspects of the innovations herein and, together with the description, help illustrate the principles of the present inventions. In the drawings.

DETAILED DESCRIPTION OF ILLUSTRATIVE IMPLEMENTATIONS

Reference will now be made in detail to the inventions herein, examples of which are illustrated in the accompanying drawings. The implementations set forth in the following description do not represent all implementations consistent with the claimed inventions. Instead, they are merely some examples consistent with certain aspects related to the present innovations. Wherever possible, the same reference numbers will be used throughout the drawings to refer to the same or like parts.

According to some aspects of the present innovations, implementations may relate to a system for isolating virtual machine hosts over a network using a federated downstream cluster. In one illustrative embodiment, a system may include a first compute node configured to be operatively coupled to (1) a second compute node via a first application server such as an extensible messaging and presence protocol (XMPP) server, and (2) a third compute node via a second application server such as another XMPP server. Here, for example, the first compute node may be configured to be included within a federated cluster that includes the third compute node. In operation, the first compute node may be configured to receive an instruction from the second compute node via the first server to define a virtual machine. Further, the first compute node may be configured to send an instruction to the third compute node via the second server to define the virtual machine. In some embodiments, the first XMPP server can be the same as the second XMPP server.

Figure 1:
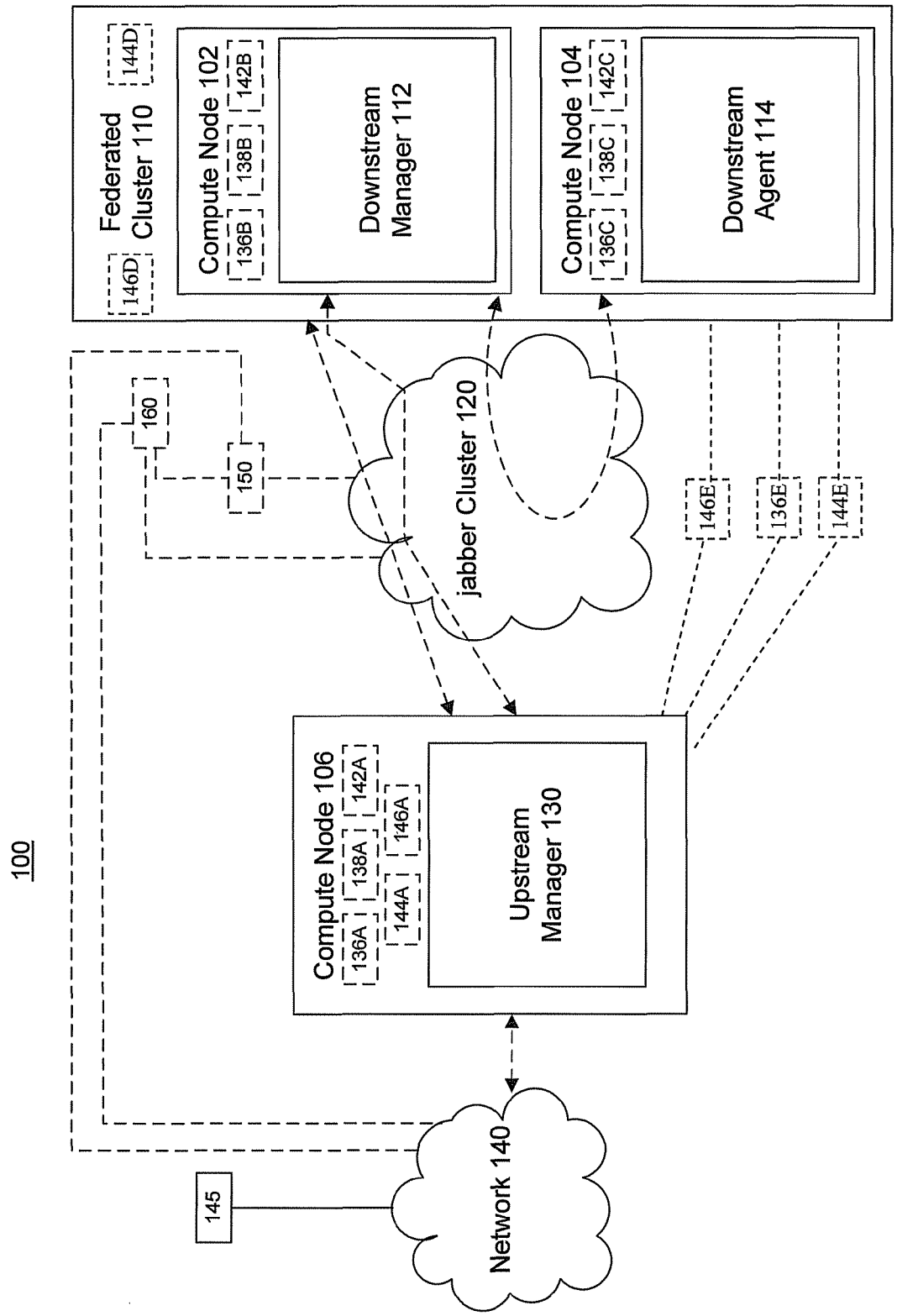
FIG. 1 is a block diagram of an illustrative system, according to a disclosed implementation.

With regard to the discussions below, a system using federated downstream clusters to isolate virtual machine hosts can be used to geographically and/or logically isolate virtual machine hosts. FIG. 1 depicts a block diagram of an illustrative system that may be involved with isolating virtual machine hosts ("system") 100, according to an embodiment. System 100 includes a federated cluster 110 including a compute node 102 and a compute node 104, an application server cluster 120 such as a jabber cluster, a compute node 106, and a network 140. In some implementations, compute node 102 of federated cluster 110 includes a downstream manager 112, compute node 104 of federated cluster 110 includes a downstream agent component 114, and compute node 106 includes an upstream manager component 130.

In some implementations detailed below, the application server cluster 120 is described as a jabber cluster that includes one or more extensible messaging and presence protocol (XMPP) servers logically connected and configured to support XMPP communication between upstream manager component 130 and downstream manager component 112, and between downstream manager component 112 and downstream agent component 114. However, various other processing components and messaging/communication protocols other than, or in conjunction with, XMPP may be utilized to process the command and control for the cluster(s), including but not limited to AMQP, ZeroMQ, and HTTP, among others. Here, for example, processing and communication may also take place via hybrid protocols, such as combination(s) of HTTP and XMPP. Thus, while some discussions of FIG. 1 may describe system 100 as including a jabber cluster, in some embodiments system 100 may comprise other application server(s) and/or protocols. For instance, in certain embodiments, a variety of processing components and/or protocols may be utilized, provided that features such as topology, isolation and message content set forth in the detailed implementations shown and described herein are achieved. Here, for example, such application servers may utilize or include messaging or communication protocol(s) that require low processing and memory resources, are standardized, are customizable, are point-to-point, and/or are configured to send and receive state and/or provisioning messages.

Additionally, while FIG. 1 may describe system 100 as including a single cluster or jabber cluster, in other embodiments, system 100 can include more than one cluster or jabber cluster. In such plural jabber cluster embodiments, for example, a first jabber cluster can include one or more servers logically connected and configured to support communication between the upstream manager 130 and the downstream manager 112, and a second jabber cluster can include one or more servers logically connected and configured to support communication between the downstream manager 112 and the downstream agent 114. In this manner, communication between downstream manager 112 and downstream agent 114 may be secured separately from communication between upstream manager 130 and downstream manager 112, and may continue in the event of a failure of any portion of the first jabber cluster.

According to implementations herein, upstream manager component 130, downstream manager component 112, and downstream agent component 114 can be a software and/or hardware module(s) located at compute nodes, such as, for example, at compute nodes 102, 104, and/or 106. A compute node can be any type of device configured to send data to one or more devices within system 100 and to devices outside of system 100 via network 140, and/or receive data from devices included in network 140 and/or from devices outside of system 100 via network 140. In some embodiments, the compute node can be configured to function as, for example, virtual machine host, a server device (e.g., a web server device), a network management device, a data repository and/or the like. The compute node can be configured to define and send provision and/or action instructions, and/or add, remove, lock, revise and/or edit a virtual machine.

In some implementations, the compute nodes may include one or more memory 136 and/or processor 138 devices or components. The memory 136 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 136 of the compute node includes data used to define, send, and receive, instructions, messages, poll requests and results, etc. In some embodiments, the memory 136 stores instructions to cause the processor 138 to execute modules, processes and/or functions associated with such a system 100.

The processor(s) 138 of the compute nodes, such as, for example, compute nodes 102, 104, and/or 106, can be any suitable processing device configured to run and/or execute within system 100. In some embodiments, the processor can be a general purpose processor, a Field Programmable Gate Array (FPGA), an Application Specific Integrated Circuit (ASIC), a Digital Signal Processor (DSP), and/or the like. The processor can be configured to execute modules, functions and/or processes to operate system 100.

According to some implementations, the upstream manager component 130 may be a software and/or hardware module(s) located at compute node 106, and may be configured to logically connect federated cluster 110 to network 140 via the application server cluster 130, such as a jabber cluster. Upstream manager component 130 may also be configured to receive hypertext transport protocol (HTTP) instructions from a device 145 of a user, for example, a customer or network administrator 150, via network 140. In some embodiments, the upstream manager component 130 may be configured to receive instructions via network 140 in other protocols, for example, representative state transfer (REST). Additionally, upstream manager component 130 may be configured to define an XMPP instruction(s) to downstream manager 112 via the application server cluster 120. In some embodiments, an XMPP instruction can include a provision instruction for defining a virtual machine.

In certain implementations, the upstream manager component 130 may be configured to receive provision results from downstream manager 112, may store those results, and may send status updates and/or results to the user etc. via network 140. Further, the upstream manager component 130 may be configured to logically interact with federated cluster 110 as a single compute node. Here, for example, the upstream manager component may be configured to treat a first federated cluster including a single downstream manager and a one or more downstream agents as a single compute node having a first amount of computing capacity, and may treat a second federated cluster including a single downstream manager and ten downstream agents as a single compute node have a second amount of computing capacity distinct from the other compute node. In this manner, upstream manager component 130 need not store state and other information for each individual downstream agent, but instead may only store state and other information for each federated cluster. Upstream manager component 130 may also be configured to include customer data, such as available capacity, virtual machine quotas, and the like. In this manner, upstream manager component may accept or decline a request to provision a virtual machine, and/or can determine provisioning option based on that customer information. With regard to an associated compute node, compute node 106 may include one or more repositories 144A and/or one or more databases 146A, in addition to the memory 136A to store system and/or customer data, provisioning rules, etc.

As set forth herein, federated cluster 110 may be a cluster of compute nodes or multiple cooperating compute nodes that may not be centrally managed. In some implementations, federating the cluster of compute nodes can include designating one of the compute nodes as the location for a downstream manager and the remaining compute nodes as the location for downstream agents. The compute node designated as the location for the downstream manager can operate an agent emulation module to couple the federated cluster to an upstream manager via an jabber cluster, and can present the federated cluster to the upstream manager as a single downstream agent including the available capacity of the whole cluster of compute nodes.

In the illustrative system shown in FIG. 1, federated cluster 110 includes downstream manager component 112 and downstream agent component 114. While shown in FIG. 1 as including a single downstream agent component 114, in some embodiments, federated cluster 110 can include any number of downstream agent components 114. Federated cluster 110 may be configured to communicate with the upstream manager 130 via application sever cluster and may be configured to logically appear to upstream manager 130 as a single compute node. Federated cluster 110 may further include or operate with local storage locations 136B, 136C and/or remote storage locations 136A, 136E for virtual machine, one or more local or remote databases 144A, 144D, 144E, and/or one or more local or remote repositories 146A, 146D, 146E, where such local databases and/or repositories may also or instead be located within specific compute nodes 102, 104. In embodiments, here, for example, such one or more local repositories 146D can be synced to an upstream repository 146A.

In some implementations, downstream manager component 112 of federated cluster 110 may be a software and/or hardware module(s) located at compute node 102 and may be configured to be logically connected to the compute node 106 and upstream manager component 130 via the application server cluster 120 and logically connected to downstream agent component 114 via the application server cluster 120. In this manner all traffic between downstream manager component 112 and upstream manager component 130, and all traffic between downstream manager component 112 and downstream agent component 114 may be sent and received via the application server cluster 120. Downstream manager component 112 can be configured to receive an instruction, such as an XMPP instruction(s), from upstream manager component 130. Downstream manager component 112 may also be configured to (1) define a provision request associated with downstream agent component 114, and (2) send that request to downstream agent component 114 via the application server cluster 120. In some embodiments, the provision request can include a request to instantiate a virtual machine. In such embodiments, the provision request refers to requests to both instantiate and provision a virtual machine. Downstream manager component 112 may be configured to receive an indication from downstream agent 114 indicating whether the provisioning was successful, and may also be configured to send a message indicating the provision result to the upstream manager 130 via jabber cluster 120.

Downstream agent component 114 of federated cluster 110 may be a software and/or hardware module(s) located at compute node 104 and may be configured to be logically connected to compute node 102 and downstream manager component 112 via the application server cluster 120. In this manner, all traffic between downstream manager component 112 and downstream agent component 114 may be sent and received via the application server cluster 120. Downstream agent component 112 may be configured to receive a provision request from downstream manager component 112 via the application server cluster 120. In some embodiments, the provision request may include a request to instantiate a virtual machine. In such embodiments, the provision request refers to requests to both instantiate and provision a virtual machine. Downstream agent component 114 may be configured to send an indication to downstream manager component 112 indicating whether the provisioning was successful. Downstream agent component 114 may be configured to define a virtual machine in response to an instruction from downstream manager component 112. In some embodiment, defining a virtual machine may include unarchiving files, templates, etc.

According to various implementations herein, network 140 may be any type of network (e.g., a local area network (LAN), a wide area network (WAN), a virtual network, a telecommunications network) implemented as a wired network and/or wireless network. A user may communicate with system 100 via network 140. As such, in some embodiments, a user devices 145 may send data to and/or receive data from the compute node 106 using one or more communication modes (e.g., email, text messages, instant messages, optical pattern transmissions, using a mobile device application, via a website, using a personal computer (PC) application, an interactive advertisement, an ITV, TCP/IP transmissions, interactive voice response (e.g., via touch tones and/or voice recognition), etc.) that may be transmitted to the compute node 106 using a common network.

Consistent with present implementations, system 100 may be configured such that state information of federated cluster 110 is sent, using, for example, an XMPP message, to upstream manager component 130. In this manner, upstream manager component 130 may have access to much of the computing capacity of the federated cluster 110 while only updating state information when a state change within federated cluster 110 occurs. This allows federated cluster 110 to operate with less administrative overhead, making system 100 and federated cluster 110 more scalable. Furthermore, because the application server cluster 120 sees federated cluster 110 as a single downstream agent, any compute node and/or associated downstream agent of federated cluster 110 may act as a service endpoint, for example, a location to instantiate a virtual machine. In this manner, if any portion of federated cluster 110, for example, a portion of compute node 104 and/or downstream manager 114 becomes unavailable, upstream manager component 130 may send a provision request to another location, may reboot an offline virtual machine in another location, and/or may migrate a virtual machine to another location.

System 100 may be configured such that downstream manager component 112 receives commands and requests from upstream manager component 130, but need not be controlled by upstream manager component 130. In such embodiments, upstream manager component 130, and associated users, may have access to federated cluster 110's computing capacity without having complete control of federated cluster 110's compute capacity. In this manner, federated cluster 110, via downstream manager component 112, may be configured to limit, via quotas, permissions, etc., the computing capacity available to upstream manager component 130. Indeed, here, isolating control of the federated cluster 110 from upstream manager component 130 may prevent upstream manager component 130, or a user of upstream manager component 130, from monopolizing the compute capacity of federated cluster 110.

In implementations herein, system 100 may be configured such that compute node 106 may be operatively coupled to federated cluster 110 via an application server cluster 120 using lower quality links, for example, wireless area network (WAN) link, or internet links. Similarly, system 100 may be configured such that compute node 102 and compute node 104, within federated cluster 110, may be operatively coupled to federated cluster 110 via application server cluster 120 using lower quality links. System 100 may be configured such that if a link through the cluster 120 fails, either between upstream manager component 130 and downstream manager component 112, or between downstream manager component 112 and downstream agent component 114, system 100 may failover to a new link. In some embodiments, a waiting period may pass before a new link is initiated, for example, to prevent premature failover. By way of example, upstream manager component 130 may detect that a communication link to downstream manager 112 has failed. Upstream manager component 130 may wait a predetermined amount of time, and may then establish a new link to downstream manager component 112 through jabber cluster 120. This allows system 100 to have improved reliability and fault recovery.

Figure 2:
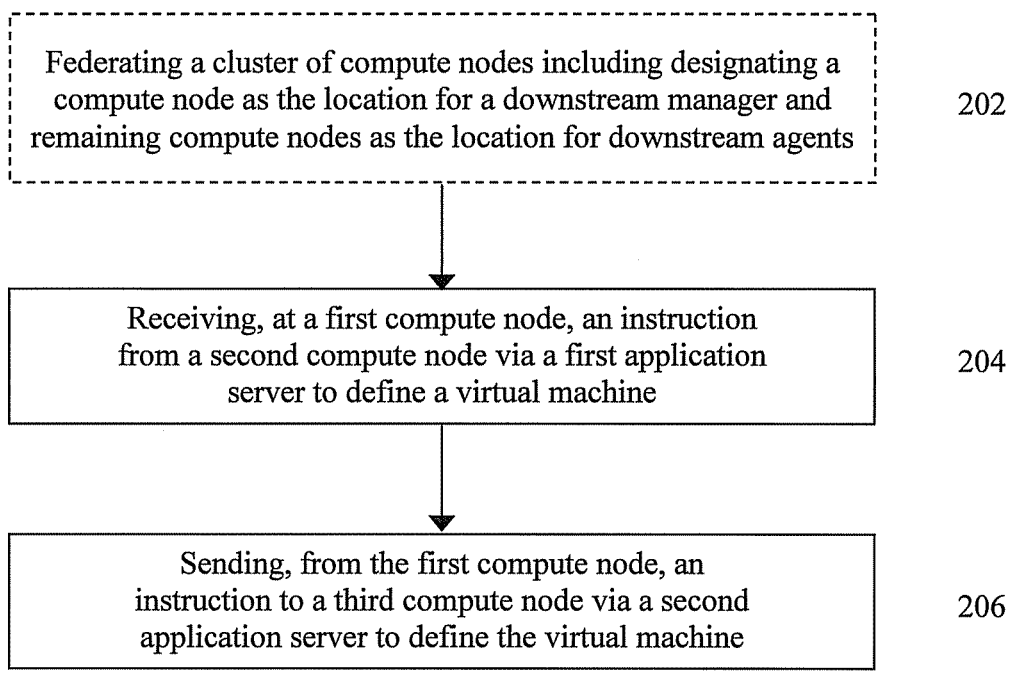
FIG. 2 is a flow chart depicting an illustrative method related to virtual machine host isolation, according to a disclosed implementation.

FIG. 2 depicts a flow chart of an illustrative method 200 of operating a system for isolating virtual machine hosts, according to an embodiment, and with reference to the system 100 depicted in FIG. 1. In FIG. 2, as with other methods herein, processing related to performance of the method steps may be performed by or among one or more of the various entities within the system. For example, the method steps or processing related thereto may be performed by one or more processing elements in the system, such as via the federated cluster 110, one or more compute nodes, including but not limited to those within the federated cluster, one or more network administrator components 150, and/or one or more management components 160. According to the exemplary implementation shown in FIG. 2, an illustrative method may comprise a first, optional step of federating a cluster of compute nodes including designating a compute nodes as the location for a downstream manager and remaining compute nodes as the location for downstream agents 202. However, such federation may occur prior to the processing described in more detail below, for example, by another entity. Method 200 may then proceed to and includes receiving, at a first compute node, an instruction from the second compute node (e.g., via a first XMPP server) to define a virtual machine, at 204. Following the details set forth in the implementation of FIG. 1, downstream manager component 112 may receive an instruction from the upstream manager component 130 via an application server cluster 120 to define a virtual machine. An instruction is sent from the first compute node to a third compute node via the second XMPP server to define the virtual machine, at 206. Downstream manager component 112 may then send an instruction to downstream agent component 114 via the cluster 120 to define a virtual machine.

Figure 3:
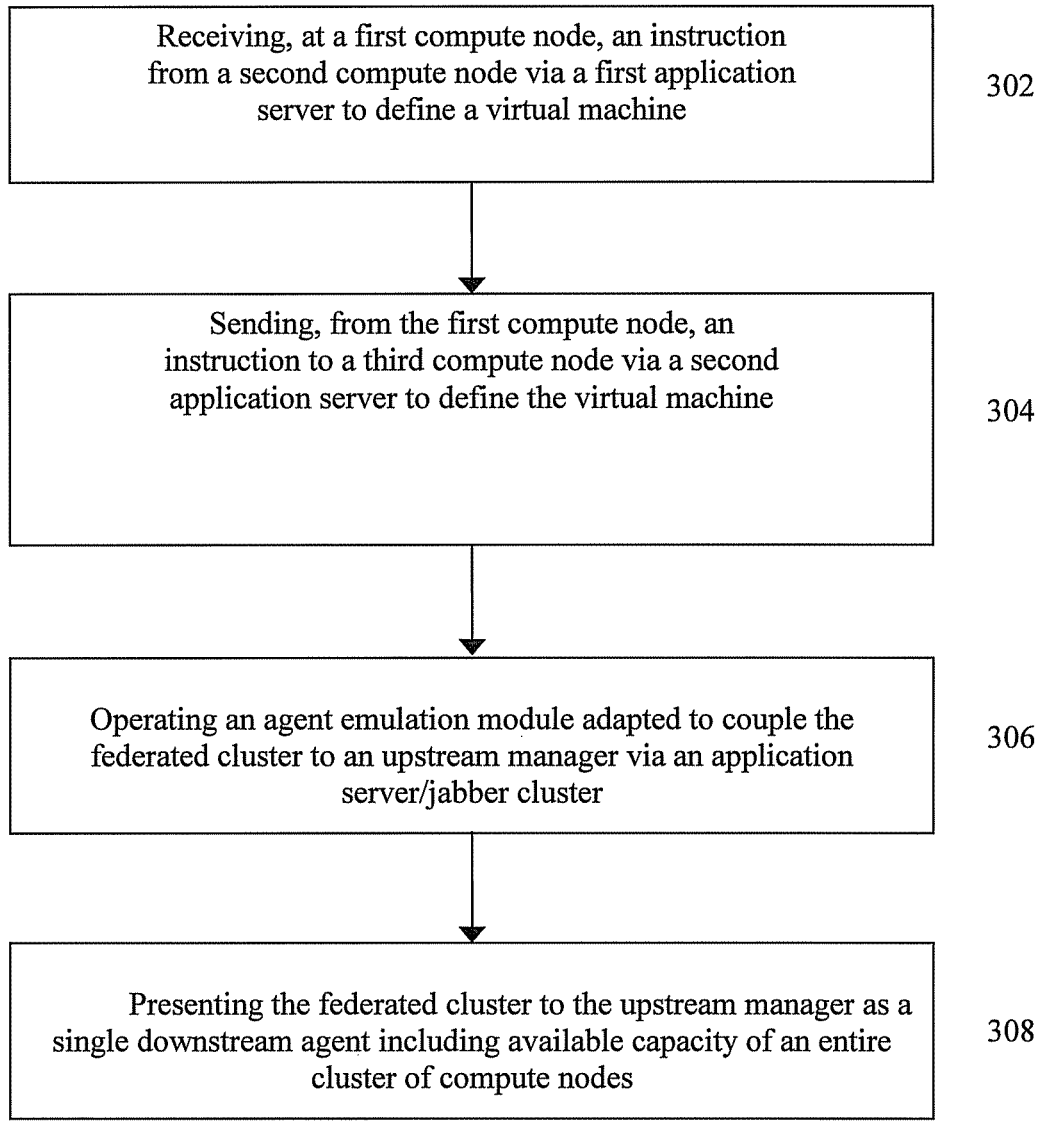
FIG. 3 is a flow chart depicting another illustrative method related to virtual machine host isolation, according to a disclosed implementation.

FIG. 3 is a flow chart depicting another method of processing information related to isolating virtual machine hosts, according to a disclosed implementation. The processing of FIG. 3 may be performed by or among one or more of the various entities in the system 100, as explained above.

The illustrative method 300 of FIG. 3 may begin with the steps of FIG. 2, namely receiving, at a first compute node, an instruction from the second compute node (e.g., via a first XMPP server) to define a virtual machine, at 302. Further, an instruction may be sent from the first compute node to a third compute node via the second XMPP server to define the virtual machine, at 304. Additionally, the method 300 may comprise, at 306, receiving an indication from the downstream agent component indicating whether the provisioning was successful, and, at 308, sending a message indicating the provision result to the upstream manager component.

Figure 4:
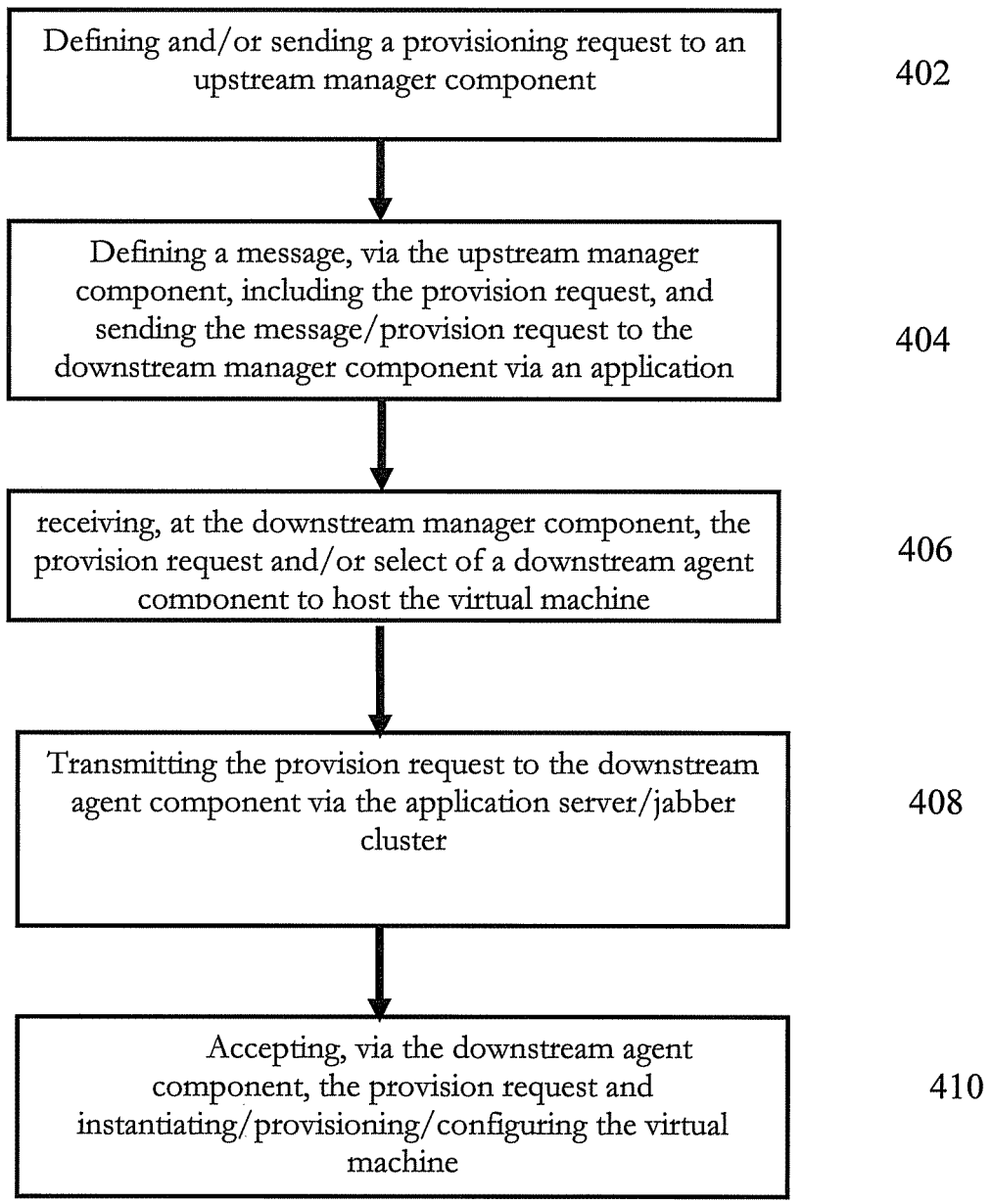
FIG. 4 is a flow chart depicting a further illustrative method related to virtual machine host isolation, according to a disclosed implementation.

FIG. 4 is a flow chart depicting a further method for virtual machine isolation, according to a disclosed implementation. In FIG. 4, as with other figures and processes herein, processing related to performance of the method steps may be performed by among one or more of the various entities within the system. For example, the method steps or processing related thereto may be performed by one or more processing elements in the system, such as via the federated cluster 110, one or more compute nodes, including but not limited to those within the federated cluster, one or more network administrator components 150, and/or one or more management components 160. According to the exemplary implementation shown in FIG. 4, an illustrative method may comprise, at 402, processing information, related to defining and/or sending a provisioning request to an upstream manager component 130. Then, at 404, processing information related to defining a message, via the upstream manager component 130, including the provision request, and sending the message/provision request to the downstream manager component 112 via an application server/jabber cluster 120. Next, the method may comprise, at 406, processing information related to receipt, at the downstream manager component 112, of the provision request and/or selection of a downstream agent component 114 to host the virtual machine, as well as, at 408, processing information related to transmission of the provision request to the downstream agent component 114 via the application server/jabber cluster 120. Finally, the illustrative method of FIG. 4 may comprise, at 410, processing information related to accepting, via the downstream agent component 114, the provision request and instantiating/provisioning/configuring the virtual machine.

Figure 5:
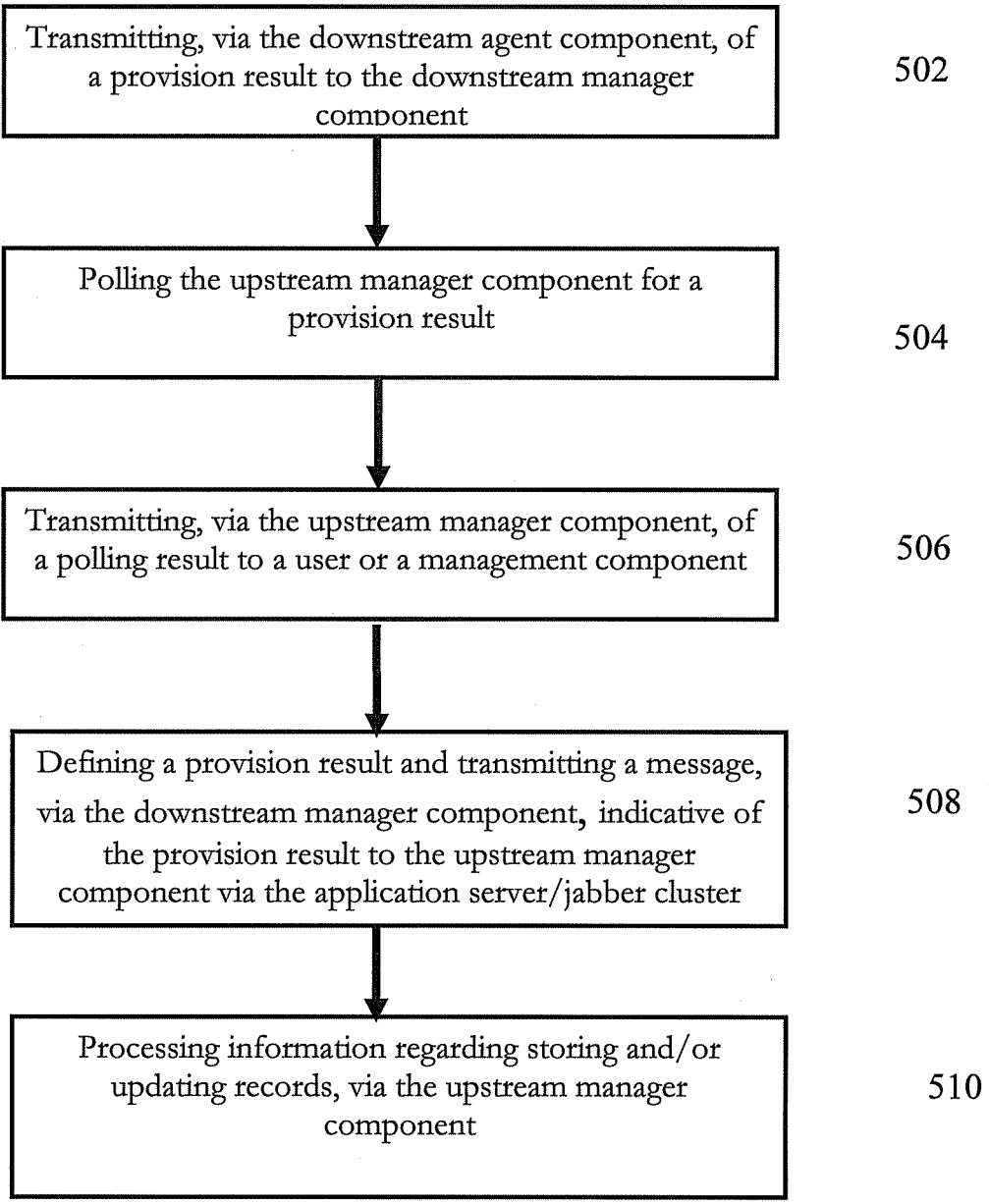
FIG. 5 is a flow chart depicting still another illustrative method related to virtual machine host isolation, according to a disclosed implementation.

FIG. 5 is a flow chart depicting still another method for virtual machine isolation, according to a disclosed implementation. The processing of the exemplary method of FIG. 5 may be performed by the components and/or distributed components set forth above. According to the exemplary implementation shown in FIG. 5, another illustrative method may comprise, at 502, processing information regarding transmission, via the downstream agent component 114, of a provision result to the downstream manager component 112. Further, the method may comprise, at 504, processing information regarding polling the upstream manager component 130 for a provision result. Next, the method may comprise, at 506, processing information regarding transmission, via the upstream manager component 130, of a polling result, such as to a user 145, an administrator 150 and/or a management component 160. Then, the method may comprise processing information regarding defining a provision result and transmitting a message, via the downstream manager component 112, indicative of the provision result to the upstream manager component 130 via the application server/jabber cluster 120. Finally, at 510, the method may comprise processing information regarding storing and/or updating records, via the upstream manager component 130.

Figure 6:
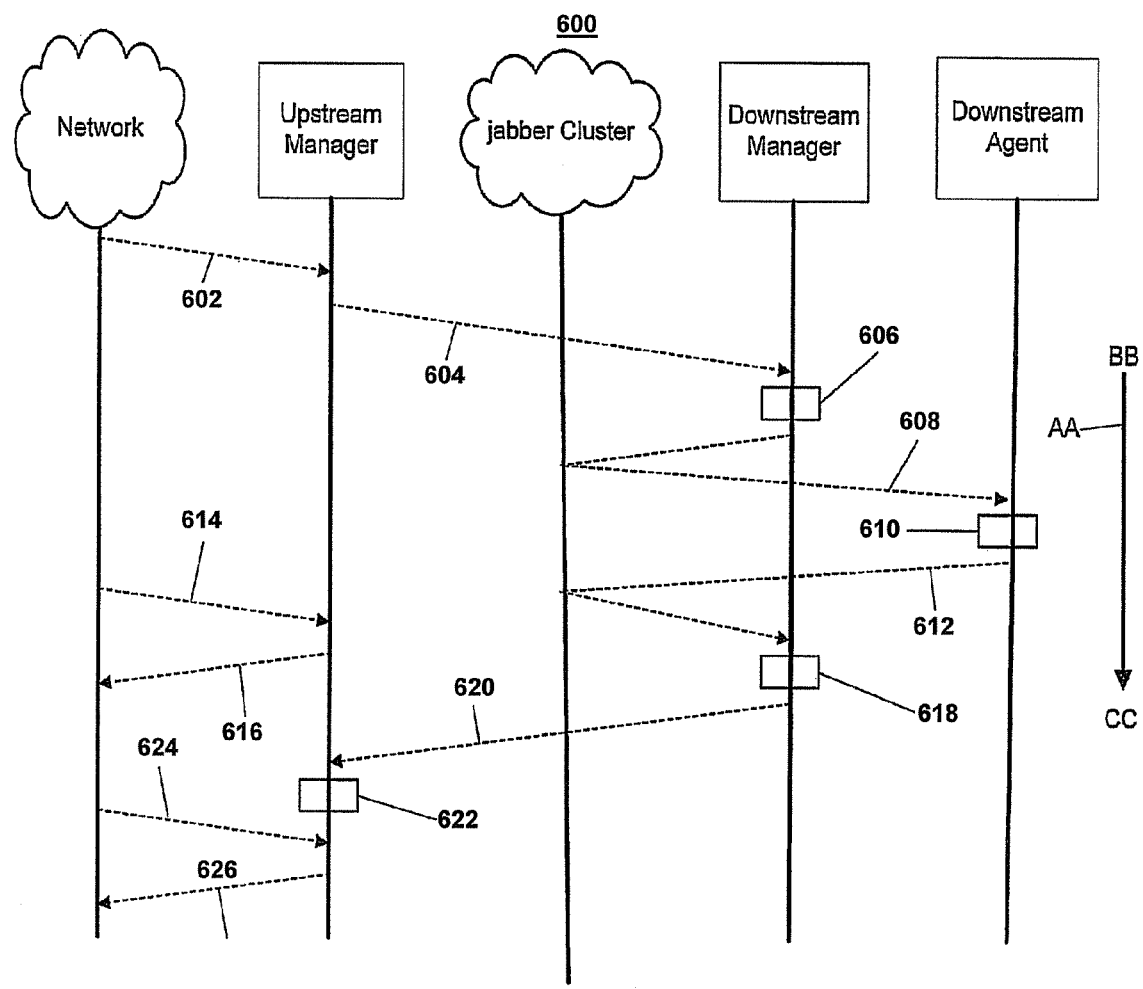
FIG. 6 is a flow diagram depicting an illustrative method of operation for isolating virtual machine host(s), according to an implementation.

FIG. 6 depicts a flow diagram depicting an illustrative method 600 of operating a system for isolating virtual machine hosts, according to a disclosed implementation. Method 600 flows along arrow AA from BB to CC. As shown in method 600, a user accesses a network with a user device, defines a provision request (e.g. instantiating, provisioning, and/or configuring a virtual machine), and sends a provision request via HTTP or REST to the upstream manager, at 602. The upstream manager defines an XMPP message including the provision request, and sends the XMPP provision request to downstream manager via jabber cluster, at 604. In some embodiments, the upstream manager may validate the configuration, including verifying that the request does not violate any user permissions or constraints. Downstream manager then receives the XMPP provision request and selects a downstream agent to host the virtual machine at 606, and sends the provision request to downstream agent via jabber cluster, at 608. Downstream agent may then accept the provision request and instantiate, provision, and/or configure the virtual machine, at 610. In some embodiments, instantiating, provisioning, and/or configuring the virtual machine may include, for example, unarchiving files, templates, etc. In some embodiments, downstream agent may decline the provision request. In such embodiments, downstream agent may send a decline response to downstream manager, and downstream manager may select an alternative downstream agent. Downstream agent sends a provision result to downstream manager, at 612. The user device polls the upstream manager for a provision result, at 614. The upstream device may then send a polling result to the user device. For example, the polling result may indicate that the provisioning is in-progress, has failed, or is complete, at 616. Downstream manager defines a provision result, at 618, and sends a message indicative of the provision result to the upstream manager via jabber cluster, at 620. The upstream manager stores the result of the provision request and updates user records, for example, virtual machine quotas etc., at 622. The user device may then poll the upstream manager for a provision result, at 624. Finally, the upstream device may send a polling result to the user device, for example, the polling result may indicate that the provisioning is in-progress, has failed, or is complete, at 626.

As used in this specification, the singular forms "a," "an" and "the" include plural referents unless the context clearly dictates otherwise. Thus, for example, the term "a downstream agent" is intended to mean a single downstream agent, or a combination of downstream agents.

Some embodiments described herein relate to a computer storage product with a computer-readable medium (also may be referred to as a processor-readable medium) having instructions or computer code thereon for performing various computer-implemented operations. The media and computer code (also may be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein may include various combinations and/or sub-combinations of the functions, components and/or features of the different embodiments described. For example, while FIG. 1 depicts a single federated cluster 110 having a single downstream agent 114, in some embodiments, the system 100 may include two or more federated clusters 110 each having one or more downstream agents 114.

The invention claimed is:

1. A method for processing information regarding virtual machine host isolation, the method comprising:
    federating a cluster of compute nodes including a first compute node and a third compute node including designating the first compute node as a downstream manager and the third compute node and any remaining compute nodes as the location for downstream agents, wherein the federated cluster is configured to logically appear to a second compute node as an upstream manager component as a single compute node;
    receiving, at the first compute node, an instruction from the second compute node via a first application server to define a virtual machine; and
    sending, from the first compute node, an instruction to the third compute node via a second application server to define a virtual machine.

2. The method of claim 1 further comprising:
    transmitting state information of the federated cluster, via an XMPP message, to the second compute node, such that the upstream manager component has access to the federated cluster's computing capacity while only updating state information when a state change within the federated cluster occurs, wherein the federated cluster thereby operates with less administrative overhead, making the system and the federated cluster more scalable.

3. A method for processing information regarding virtual machine host isolation, the method comprising:
    via a first compute node:
        operating an agent emulation module adapted to couple a federated cluster to a second compute node via an application server cluster or jabber cluster; and/or
        presenting a federated cluster to the second compute node as a single downstream agent including available capacity of an entire cluster of compute nodes;
    receiving, at the first compute node, an instruction from the second compute node via a first application server to define a virtual machine; and
    sending, from the first compute node, an instruction to a third compute node via a second application server to define a virtual machine.

4. A method for processing information regarding virtual machine host isolation, the method comprising:
    receiving, at a first compute node, an instruction from a second compute node via a first application server to define a virtual machine; and
    sending, from the first compute node, an instruction to a third compute node via a second application server to define a virtual machine; wherein
    a provision request associated with the third compute node is defined, via the first computer node, and the provision request is sent to the third compute node.

5. The method of claim 4 wherein the provision request includes a request to instantiate and/or provision a virtual machine, and further comprising, via the first compute node:
    receiving an indication from the third compute node indicating whether the provisioning was successful; and/or
    sending a message indicating the provision result to the second compute node.

6. A method for processing information regarding virtual machine host isolation, the method comprising:
    processing information related to defining and/or sending a provisioning request to an upstream manager component;
    processing information related to defining a message, via the upstream manager component, including the provision request, and sending the message or provision request to the downstream manager component via an application server cluster or jabber cluster;
    processing information related to receipt, at the downstream manager component, of the provision request and/or selection of a downstream agent component to host the virtual machine;
    processing information related to transmission of the provision request to the downstream agent component via the application server cluster or jabber cluster; and
    processing information related to accepting, via the downstream agent component, the provision request and instantiating, provisioning, or configuring the virtual machine.

7. The method of claim 6 wherein the instantiating, provisioning, or configuring the virtual machine includes unarchiving files and/or templates.

8. The method of claim 6 further comprising processing information regarding decline, by the downstream agent component, of the provision request, wherein the downstream agent component is configured to send a decline response to the downstream manager component, and the downstream manager component is configured to select an alternative downstream agent.

9. The method of claim 6 further comprising processing information regarding validating, via the upstream manager component, the configuration, including verifying that the request does not violate any permissions or constraints.

10. The method of claim 6 further comprising:
    processing information regarding transmission, via the downstream agent component, of a provision result to the downstream manager component;
    processing information regarding polling the upstream manager component for a provision result;
    processing information regarding transmission, via the upstream manager component, of a polling result to a user or a management component;
    processing information regarding defining a provision result and transmitting a message, via the downstream manager component, indicative of the provision result to the upstream manager component via the application server cluster or jabber cluster;
    processing information regarding storing and/or updating records, via the upstream manager component.

11. The method of claim 10 further comprising processing information regarding:
    polling, via the user or the management component, the upstream manager component for a provision result; and
    transmission, via the upstream manager component, a polling result to the user or the management component.

12. A system comprising:
    a first compute node;
    a second compute node operatively coupled to the first compute node via a first application server; and
    a third compute node operatively coupled to the first compute node via a second application server;
    wherein the first compute node is included within a federated cluster that includes the third compute node, and is configured: to receive an instruction from the second compute node via the first application server to define a virtual machine, and to send an instruction to the third compute node via the second application server to define the virtual machine;
    wherein the first application server and the second application server are extensible messaging and presence protocol (XMPP) servers.

13. A system comprising:
    a federated cluster component including:
        one or more compute nodes including a first compute node, which is connected to a second compute node outside the federated cluster, and a third compute node;
        a downstream management component associated with a first compute node; and
        a downstream agent component associated with a second compute node;
        wherein the second compute node is operatively coupled to the first compute node via one or more application servers;
    wherein the first compute node is included within a federated cluster that includes the third compute node, and configured: to receive an instruction from the second compute node via a first application server to define a virtual machine, and to send an instruction to the third compute node via a second application server to define the virtual machine.

14. A system comprising:
    a federated cluster including one or more compute nodes, a downstream management component associated with a first compute node, and a downstream agent component associated with a second compute node;
    an application server cluster configured with a messaging or communication protocol that supports communication between upstream and downstream manager-agent components;
    a first compute node;
    a second compute node operatively coupled to the first compute node via a first application server; and
    a third compute node operatively coupled to the first compute node via a second application server;
    wherein the first compute node is included within a federated cluster that includes the third compute node, and configured: to receive an instruction from the second compute node via the first application server to define a virtual machine, and to send an instruction to the third compute node via the second application server to define the virtual machine.

15. The system of claim 13 wherein the federated cluster includes a cluster of compute nodes or multiple cooperating compute nodes that are not centrally managed, and wherein one of the compute nodes is designated as a location for the downstream manager component and any remaining compute nodes as the location for downstream agents.

16. The system of claim 13 wherein a compute node within the federated cluster is designated as the location for the downstream manager and is configured to:
    operate an agent emulation module adapted to couple the federated cluster to an upstream manager via an application server cluster or jabber cluster; and/or
    present the federated cluster to the upstream manager as a single downstream agent including available capacity of an entire cluster of compute nodes.

17. The system of claim 13 wherein the messaging or communication protocol is configured to require low processing and memory resources, is standardized, is customizable, is point-to-point, and/or is configured to send and receive state and/or provisioning messages.

18. The system of claim 13 wherein the application server cluster includes an XMPP application server including one or more extensible messaging and presence protocol (XMPP) servers logically connected and configured to support XMPP communication(s).

19. The system of claim 18 wherein the XMPP application server comprises at least one jabber cluster, and wherein the one or more XMPP servers are configured to support XMPP communication between an upstream manager component and a downstream manager component, and between the downstream manager component and a downstream agent component.

20. The system of claim 18 wherein the XMPP application server comprises two or more jabber clusters, including a first jabber cluster having one or more servers logically connected and configured to support communication between an upstream manager component and a downstream manager component, and a second jabber cluster having one or more servers logically connected and configured to support communication between the downstream manager component and a downstream agent component, such that communication between the downstream manager component and the downstream agent component is secured separately from communication between the upstream manager component and the downstream manager component and is configured to continue in the event of a failure of any portion of the first jabber cluster.

21. The system of claim 13 wherein the downstream manager component is configured to define a provision request associated with the downstream agent component, and send the provision request to the downstream agent component.

22. The system of claim 21 wherein the provision request includes a request to instantiate and/or provision a virtual machine, and the downstream manager component is configured to:
    receive an indication from the downstream agent component indicating whether the provisioning was successful; and/or
    send a message indicating the provision result to the upstream manager component.

23. The system of claim 13 wherein the system is configured such that state information of the federated cluster is sent, such as via an XMPP message, to upstream manager component, such that the upstream manager component has access to the federated cluster's computing capacity while only updating state information when a state change within the federated cluster occurs, wherein the federated cluster thereby operates with less administrative overhead, making the system and the federated cluster more scalable.

24. The system of claim 13 wherein the system is configured so that the one or more application servers see the federated cluster as a single downstream agent, such that any compute node and/or associated downstream agent of the federated cluster can act as a service endpoint, wherein, if any portion of federated cluster becomes unavailable, the upstream manager component is configured to send a provision request to another location, reboot an offline virtual machine in another location, and/or migrate a virtual machine to another location.

* * * * *